(12) United States Patent
Sasai et al.

(10) Patent No.: US 6,510,412 B1
(45) Date of Patent: Jan. 21, 2003

(54) METHOD AND APPARATUS FOR INFORMATION PROCESSING, AND MEDIUM FOR PROVISION OF INFORMATION

(75) Inventors: Takashi Sasai, Chiba (JP); Masakazu Hattori, Kanagawa (JP); Yasuhiko Kato, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/463,927
(22) PCT Filed: Jun. 2, 1999
(86) PCT No.: PCT/JP99/02950
   § 371 (c)(1),
   (2), (4) Date: Apr. 19, 2000
(87) PCT Pub. No.: WO99/63425
   PCT Pub. Date: Dec. 9, 1999

(30) Foreign Application Priority Data
   Jun. 2, 1998 (JP) .......................................... 10-152824

(51) Int. Cl.⁷ .............................................. G10L 15/18
(52) U.S. Cl. ...................................... 704/257; 704/275
(58) Field of Search ................................. 704/270, 275, 704/231, 257, 205, 207, 272, 255

(56) References Cited

U.S. PATENT DOCUMENTS

| | | | | |
|---|---|---|---|---|
| 5,477,511 A | * | 12/1995 | Englehardt | 369/25.01 |
| 6,070,140 A | * | 5/2000 | Tran | 704/232 |
| 6,167,376 A | * | 12/2000 | Ditzik | 704/231 |
| 6,249,765 B1 | * | 6/2001 | Adler et al. | 379/88.03 |
| 6,266,642 B1 | * | 7/2001 | Franz et al. | 704/257 |

* cited by examiner

Primary Examiner—Richemond Dorvil
(74) Attorney, Agent, or Firm—Jay H. Maioli

(57) ABSTRACT

An interfacing unit 30 recognizes the input speech of a user to output recognized results to a concept extraction unit 31. The concept extraction unit 31 extracts the conceptual elements from the recognized results supplied from the interfacing unit 30. An intention interpretation unit 32 interprets the user's intention in association with the conceptual elements extracted from the concept extraction unit 31. An information management unit 33 supervises the information in association with the user's intention interpreted by the information management unit 33.

14 Claims, 14 Drawing Sheets

METHOD AND APPARATUS FOR INFORMATION PROCESSING, AND MEDIUM FOR PROVISION OF INFORMATION

TECHINCAL FIELD

This invention relates to an information processing method and apparatus and to an information furnishing medium. More particularly, it relates to such an information processing method and apparatus and to an information furnishing medium in which conceptual elements are extracted from the input information, the user's intention in inputting the information is construed and the information is managed in agreement with the construed user's intention to enable information management more easily and promptly.

BACKGROUND ART

The PIM (personal information manager) for supervising the personal information, such as schedule or the address records, may be exemplified by electronic notebooks and PDA (personal digital assistant). There are also occasions wherein the PIM constituted by the software is executed and used on a personal computer. In the present description, these are collectively termed the personal information management devices.

In the personal information management device, having the PIM functions, the functions are generally classified depending on the managed information. For example, if the addresses are inputted, a user starts the address record function of the personal information management device to register the addresses therein.

However, in the information the user desires to register, there is such information that cannot be classified definitely, such as memo records. Since the conventional personal information management device lacks in the functions of automatically classify and sorting the contents for management, it is up to the user to classify or put into order the contents to then register the memo in the associated management device function in the personal information management, which means a serious burden on the user.

It may be contemplated to hold the memo as such and to record it as speech in a sound recording device, such as a tape recorder. However, if, in this case, the information becomes voluminous, it becomes difficult to search the necessary information from the voluminous information.

DISCLOSURE OF THE INVENTION

In view of the above-described status of the art, the present invention provides an information processing method and apparatus and an information furnishing medium in which the information can be managed more easily and promptly.

In the present invention, the conceptual elements are extracted from the input information, the user's intention in inputting the information is construed in agreement with the extracted conceptual elements and pre-set processing is executed on the information in keeping with the construed user's intention.

In one aspect, the present invention provides an information processing device including inputting means for inputting the information, extraction means for extracting conceptual elements from the information inputted from the inputting means, interpreting means for interpreting the user's input intention of the information in association with the conceptual elements extracted by the extracting means, and executing means for executing pre-set processing on the information in association with the input intention as interpreted by the interpreting means.

In another aspect, the present invention provides an information processing method including an inputting step for inputting the information, an extracting step for extracting conceptual elements from the information inputted in the inputting step, an interpreting step for interpreting the user's input intention in association with the conceptual elements extracted in the extracting step, and an executing step for executing pre-set processing on the information in association with the input intention construed in the interpreting step.

In yet another aspect, the present invention provides an information furnishing medium for furnishing a computer-readable program adapted for causing an information processing device to execute the processing which includes an inputting step for inputting the information, an extracting step for extracting conceptual elements from the information inputted in the inputting step, an interpreting step for interpreting the user's input intention in association with the conceptual elements extracted in the extracting step, and an executing step for executing pre-set processing on the information in association with the input intention construed in the interpreting step.

BEST MODE FOR CARRYING OUT THE INVENTION

Figure 1:
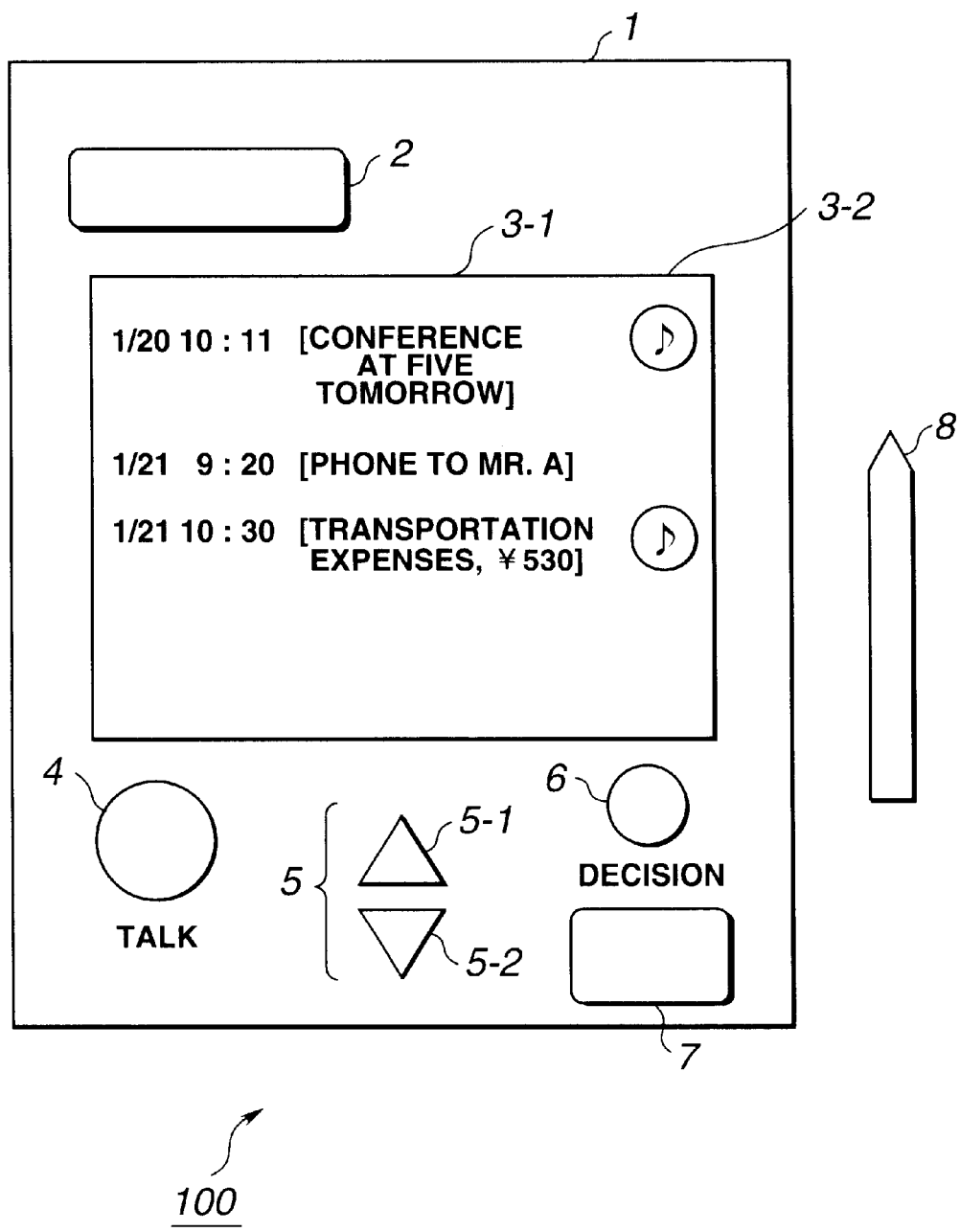
FIG. 1 is a plan view showing an illustrative structure of an embodiment of a personal information management device which is an application of an information processing device according to the present invention.

Referring to the drawings, preferred embodiments of the present invention will be explained in detail.

FIG. 1 shows an overall view of an illustrative structure of a personal information management device which is an application of the information processing device of the present invention.

This personal information management device 1 has a main body portion 1 including a speaker 2, a display 3-1, a talk switch 4, a scroll key, a decision key 6 and a microphone 7.

The speaker 2 is configured for outputting the speech synthesized as later explained or the speech corresponding to the recorded information.

The display 3-1 is configured for displaying the GUI (graphic user interface) of an application program. On the surface of the display 3-1, there is arranged a so-called touch panel (touch tablet) 3-2 which, when touched with a touch pen 8 or a finger by a user, outputs a signal corresponding to a position indicated in this manner. This touch panel 3-2 is formed of a transparent material, such as glass or resin, such that the user can view a picture demonstrated on the display unit 3-1 via the touch panel 3-2. With the aid of this touch panel 3-2, the user is also able to input (represent) a pre-set letter on the touch panel 3-2 or to select or execute a pre-set object (icon) on the display 3-1.

The talk switch 4 is a button acted upon when inputting the speech over the microphone 7. During the time this talk switch 4 is continuously acted on by the user, the speech is accepted by (inputted to) the personal information management device.

The scroll key 5 is constituted by an upward key 5-1 and a downward key 5-2. The upward key 5-1 is acted on when scrolling a picture displayed on the display 3-1 upwards, while the downward key 5-2 is acted on when scrolling a picture displayed on the display 3-1 downwards.

Figure 2:
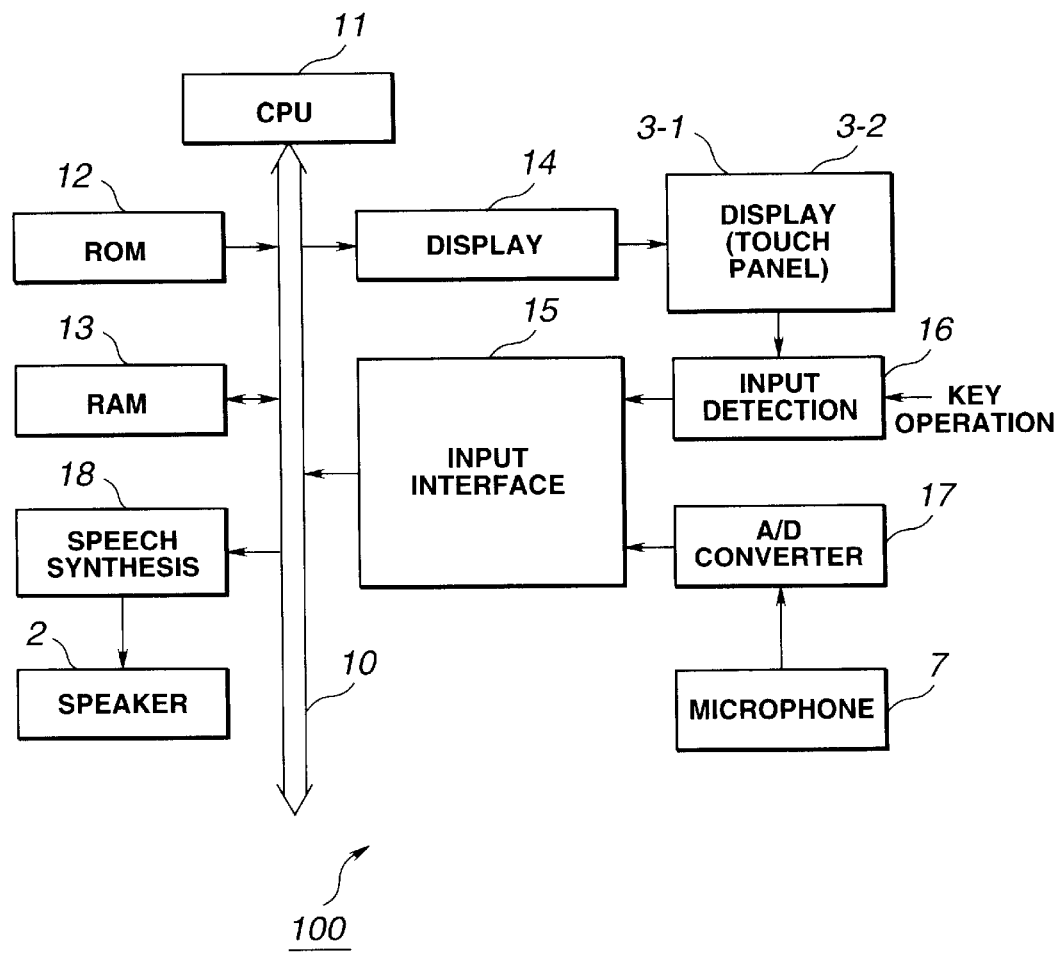
FIG. 2 is a block diagram showing an illustrative internal electrical structure of the personal information management device shown in FIG. 1.

FIG. 2 is a block diagram showing an illustrative internal electrical structure of the personal information management device 100. This personal information management device 100 includes a CPU 11, a ROM 12, a RAM 13, a display controller 14, an input interface 15 and a speech synthesis unit 18, interconnected over an internal bus 10. To this input interface 15 are connected an input detection unit 16 and an A/D converter 17. To the display controller 14 is connected the display unit 3-1. To the input detection unit 16 are connected the touch panel 3-2, talk switch 4, scroll switch 5 and the decision switch 6. To the speech synthesis unit 18 is connected the speaker 2.

The CPU 11 is configured to execute a variety of processing operations in accordance with the application program stored in the ROM 12 or in the RAM 13 or with various data.

The display controller 14 generates picture data for display on the display unit 3-1, in accordance with the information furnished from the CPU 11, to display the generated data on the display unit 3-1. The input detection unit 16 detects an input via the touch panel 3-2, talk switch 4, scroll key 5 or the decision key 6 to output the corresponding operational signal to the input interface 15. The A/D converter 17 converts speech signals inputted from the microphone 7 from analog signals to digital signals which are outputted to the input interface 15.

The input interface 15 accepts the speech signals supplied from the A/D converter 17 or the operational signals supplied from the input detection unit 16 to output the accepted signals to the CPU 11. The speech synthesis unit 18 generates the synthesized speech, based on parameters or text data from the CPU 11, required for speech synthesis, and outputs the generated synthesized speech via speaker 2. The speech synthesis unit 18 also is used for reproducing the speech recorded by the RAM 13 via microphone 7.

If speech signals are entered from the microphone 7 via A/D converter 17 and input interface 15, the CPU 11 refers to the learned speech data or the dictionary information stored in the ROM 12 or RAM 13 to execute the speech recognition processing. If an operational signal (letter input operational signal) is inputted from the touch panel 3-2 via the input detection unit 16 and the input interface 15, the CPU 11 executes the letter recognition processing, using the learned speech data or the dictionary information stored in the ROM 12 or RAM 13. The distinction as to whether the input from the touch panel 3-2 is the command operational signal to a preset object (icon) demonstrated on the display unit 3-2 or the letter information is made by the application program which then is in operation.

Figure 3:
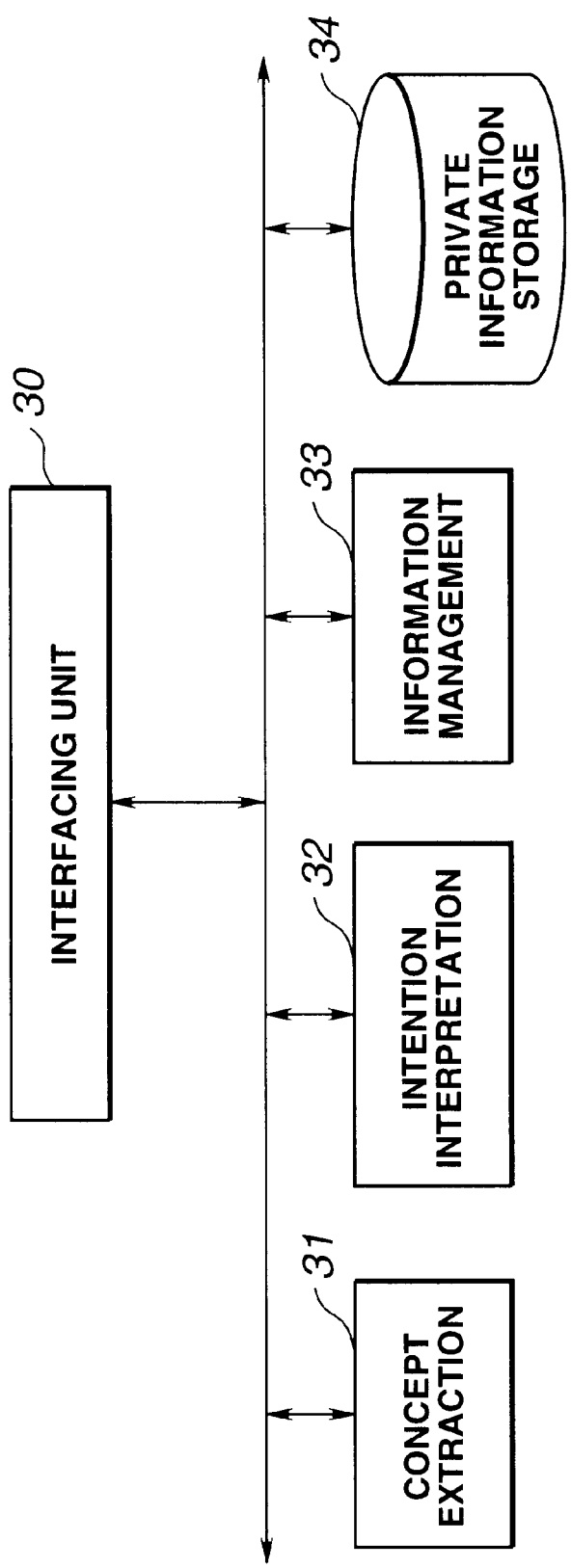
FIG. 3 is a functional block diagram showing an illustrative functional structure of the processing carried out by a CPU of the personal information management device shown in FIG. 1.

FIG. 3 shows a functional block diagram showing an illustrative functional structure of the processing to be executed by the CPU 11. In the present embodiment, an interfacing unit 30 constitutes an interface for transmitting the information between a user and the system. Thus, the interfacing unit 30 performs speech recognition processing or letter recognition processing for the speech or letter input of the information inputted by the user to formulate corresponding text data to output the formulated text data as the language information to a concept extraction unit 31. The interfacing unit 30 is also configured for detecting the non-language information inputted by the user simultaneous with the speech or letter input. If the input is the letter input, the interfacing unit detects the information, such as the time needed for the interfacing unit to input the letters or changes in the pressure applied by the pen to output the detected information to the concept extraction unit 31 and to an intention interpretation unit 32. The interfacing unit 30 presents to the user the information supplied from the concept extraction unit 3 intention interpretation unit 32 or an information management unit 33.

The concept extraction unit 31 performs natural language processing, such as phrase pattern matching, sentence construction analysis or semantic analysis, on the language information and the non-language information supplied from the interfacing unit 30 to extract the conceptual elements. The conceptual element herein means the information on the concept of a phrase having a specified compact meaning. In the extraction of the conceptual elements for the non-language information, the pattern of the corresponding conceptual element is pre-defined, such that, for the non-language information "the speech level being not lower than X", for example, the semantic information indicating "emphasis" is defined to be annexed as the conceptual element. The number of the conceptual element extracted from the sole language information inputted by the user is not necessarily one such that plural conceptual elements are occasionally extracted. The set of plural conceptual elements obtained at this time is termed a group of conceptual elements. The group of the conceptual elements, extracted by the concept extraction unit 31, is outputted to the intention interpretation unit 32.

The intention interpretation unit 32 construes, based on the group of conceptual elements supplied from the concept extraction unit 31, which intention is denoted by the language information inputted by the user. In the intention interpretation unit 32, there is provided a table of the user intention rules in which user's intentions corresponding to the combination of conceptual elements are pre-defined. Reference is made to this table to select the user's intentions most suited to the combination of the conceptual elements furnished by the concept extraction unit 31 to output the selected intention to the information management unit 33. If there is no user's intention completely suited to the combination of the conceptual elements furnished by the concept extraction unit 31, it may be contemplated to present that information via the interfacing unit 30 to the user or to select the combination presumably most suited to the user's intention.

The information management unit 33 performs the processing, such as addition (storage), deletion or retrieval of the information, to a private information storage unit 34, in keeping with the user's intention furnished by the intention interpretation unit 32, while outputting to the interfacing unit 30 the information stored in the private information storage unit 34 to be presented to the user. The information management unit 33 also is configured for storing the speech inputted from the interfacing unit 30 in association with the group of conceptual elements extracted from the concept extraction unit 31. The information management unit 33 is configured to store the speech inputted from the interfacing unit 30 in association with the group of the conceptual elements extracted by the concept extraction unit 31 in the private information storage unit 34.

The private information storage unit 34 is a database constructed on the RAM 13 in which recorded speech data, speech recognition data (text data) or letter recognition data (text data) is stored as the private information. In the private information storage unit 34, there is also stored the information on the group of conceptual elements detected by the concept extraction unit 31.

Figure 4:
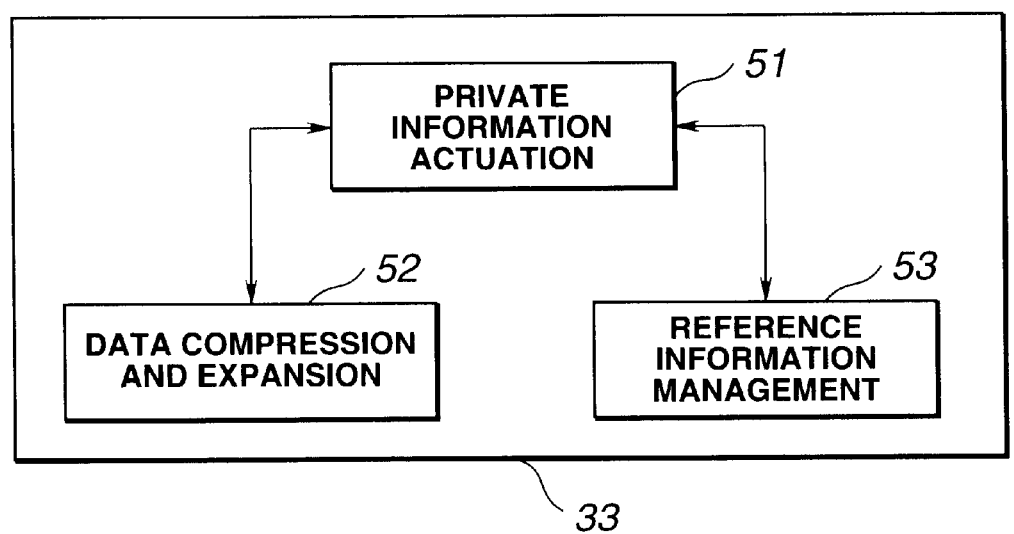
FIG. 4 is a block diagram showing a detailed illustrative structure of an information management unit of the personal information management device shown in FIG. 1.

FIG. 4 shows a detailed exemplary structure of the information management unit 33. In the present exemplary structure, the information management unit 33 is made up of a private information actuating unit 51 for storing or retrieving the information for the private information storage unit 34, a data compression and expansion unit 52, for compressing or expanding data furnished by the private information actuating unit 51 and a reference information management unit 53 for compressing or expanding data supplied from the private information actuating unit 51. The private information actuating unit 51 receives the group of the conceptual elements, extracted by the concept extraction unit 31, and the user's intention, construed by the intention interpretation unit 32, and stores or retrieves data for the private information storage unit 34. In storing the information, the private information actuating unit 51 stores the group of the conceptual elements and the user's intention along with the information of the private information storage unit 34, to effect data storage or retrieval for the private information storage unit 34. Also, in storing the information, the private information actuating unit 51 stores the group of the conceptual elements and the user intention along with the information of the private information storage unit 34 to retrieve data required by the user based on the user intention index and the conceptual element index as later explained.

The data compression and expansion unit 52 is controlled by the private information actuating unit 51 to compress the data in accordance with, for example, Huffmann encoding, as well as to expand the compressed data. The reference information management unit 53 is configured for managing the respective reference information in connection with the individual data stored in the private information storage unit 34.

The data compression and expansion unit 52 is configured for varying the information compression ratio in association with the evaluation value of the information reference frequency as later explained. Specifically, the information referred to frequently is not compressed, assuming that the information is to be expanded and presented more promptly. Alternately, the information is compressed at a lower compression ratio. For the information not used frequently, the compression ratio is raised to evade the wasteful use of the private information storage unit 34.

The reference information management unit 53 is configured for supervising the information concerning the reference of the information by the user (reference information). The reference information management unit 53 updates the reference information in keeping with the various processing operations for the private information storage unit 34 of the private information actuating unit 51. The reference information specifically is the reference frequency, that is the frequency of reference by the user to the various information.

Figure 5:
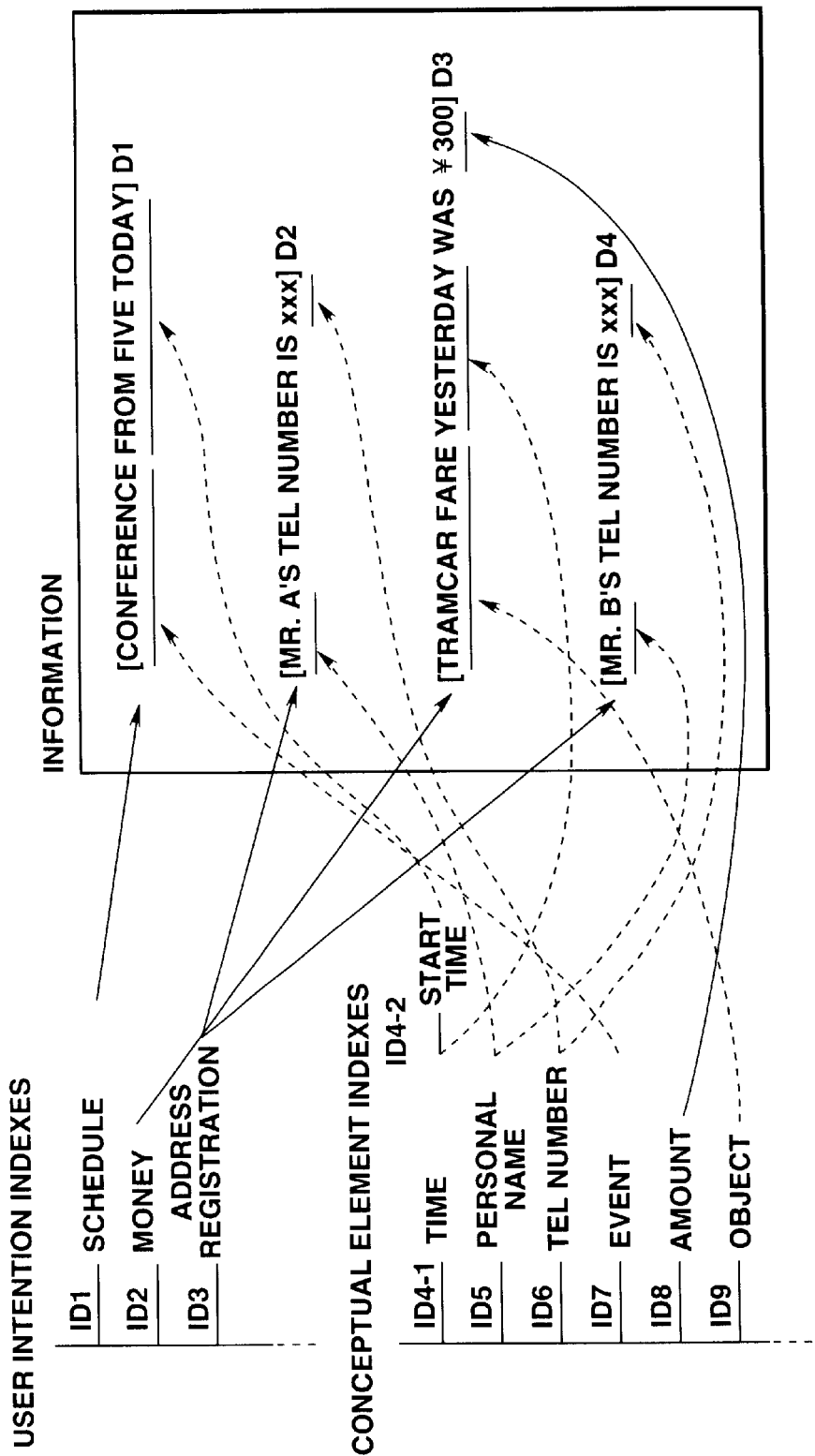
FIG. 5 illustrates the storage configuration of a personal information storage unit of the personal information management device shown in FIG. 1.

FIG. 5 shows an example of the storage configuration of the private information storage unit 34. In this example, the information (private information) is stored in association with the user intention index and the conceptual element index. The user intention index is the link for information to the private information with the user's intention as the key. For example, a user intention index ID3, having the user's intention "address registration" as the key, is linked to the information D2 on the personal address (telephone number) reading: "Mr. A's telephone number is xxx" and to the information D4 reading: "Mr. B's telephone number is xxx".

In the link information from the conceptual element index to the private information, with the conceptual element as the key, there are included the position of the phrase associated with each conceptual element and a value obtained as the conceptual element. For example, there are afforded the information indicating the position of the phrase "Mr. B" in D4 associated with the conceptual element "personal name" and the information reading "B" obtained as a value of the conceptual element in a link from the conceptual element index ID5 to the associated phrase of the information D4. To each conceptual element index, plural phrases may be associated, as in the case of the conceptual element index ID5 in which plural phrases "Mr. A" of the information D2 and "Mr. B" of the information D5 are associated. Also, the keys may be constructed in layers, as in the case of ID4-1 and ID4-2 in FIG. 5. The index information is constructed by the user's intention and the conceptual elements, defined so as to be handled in the application program. This index information is fixed unless the definition is modified from outside.

Figure 6:
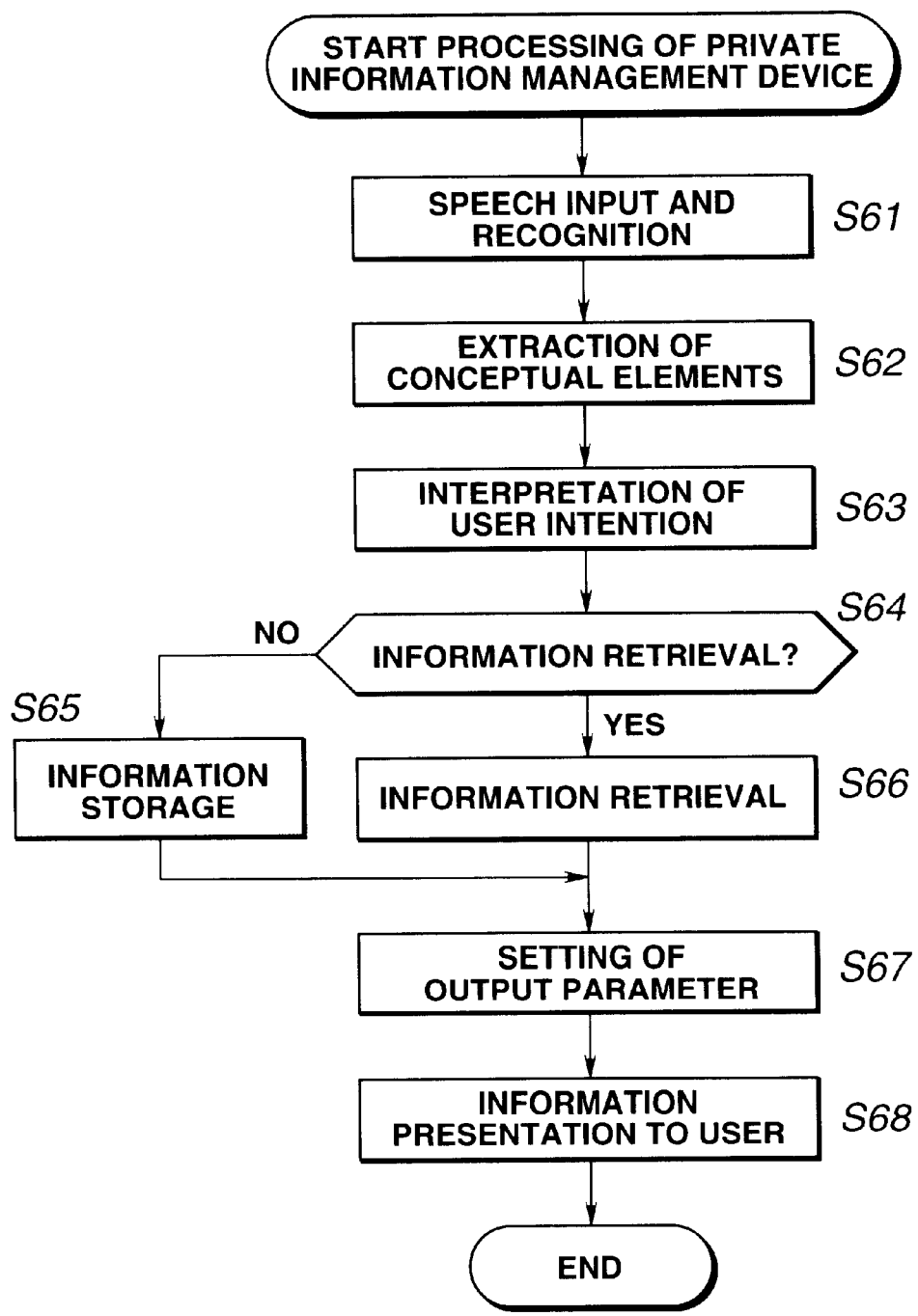
FIG. 6 is a flowchart for illustrating the operation of the personal information management device shown in FIG. 1.

Referring to FIG. 6, the operation of the personal information management device 100 is explained. Although the following processing refers to the speech inputting, similar processing is performed when letters are inputted via the touch panel 3-2. First, at step S61, the user, actuating the talk switch 4 of FIG. 1, starts inputting the speech over the microphone 7. The interfacing unit 30 recognizes the speech of the input speech to output the language information as the recognized result and the non-language information accompanying the inputting by the user to the concept extraction unit 31. If the user halts the actuation of the talk switch 4, the speech inputting comes to a close. The program then moves to step S62.

At step S62, the concept extraction unit 31 extracts the conceptual element from the language information and the non-language information supplied from the interfacing unit 30. At this time, the concept extraction unit 31 resolves the furnished language information into phrases carrying the specified semantic information. If, for example, given a sentence reading "a conference is held from five today", it is resolved into "from five today" and "conference is held". As the semantic information, a tag indicating the meaning "start time" and a tag indicating the meaning "event" are appended to "from five today" and to "conference is held", respectively. In the following, the conceptual element extracted by the concept extraction unit 31 is expressed in the form of (semantic information: word string).

For the present case, the group of conceptual elements, made up of two conceptual elements, namely (start time: from five today) and (event: conference), has been extracted from the language information. In the concept extraction for the language information, pre-defined conceptual elements are appended to the respective non-language information, as mentioned above. For example, if the speech level is not less than a pre-set threshold value, the concept extraction unit 31 deems that the meaning "crucial" is included in a user input, and extracts the conceptual element (modifier: crucial). The group of conceptual elements extracted from the language information and those extracted from the non-language information are collectively sent as a sole group of conceptual elements to the intention interpretation unit 32.

At step S63, the intention interpretation unit 32 construes the user's intention in association with the group of conceptual elements furnished from the concept extraction unit 31. In the preferred embodiment, there is provided at the outset a rule, termed an intention interpreting rule, in association with specified combinations of the conceptual elements of the group of conceptual elements. The intention interpretation is carried out according to this intention interpreting rule.

The intention interpreting rule may be exemplified, for example, by [If there is the combination of "start time" and "event" in the group of conceptual elements, the user's intention is concerned with the memorization of a schedule] and [If there is the combination of "name", "telephone" and "string of numerals" in the group of conceptual elements, the user's intention is concerned with the memorization of the telephone number].

If, at step S62, the group of conceptual elements made up of three conceptual elements of (start time: from five today), (event: conference) and (modifier: crucial), the intention interpretation unit 32 interprets the user's intention as being "memorization of schedule" in association with the intention interpreting rule. Meanwhile, if a phrase such as "retrieval" or an inquiry such as "what?" or "when?", the intention interpretation unit 32 interprets the user's intention as being "information retrieval".

Meanwhile, it may be contemplated that an unknown phrase undefined in the private information management device exists in the user's input. In such case, dropout or misinterpretation to a totally different meaning may be produced in the recognition processing at step S61. The result is failure in extraction of a correct conceptual element.

However, since the intention interpretation unit 32 interprets the user's intention in association with the combination of conceptual elements contained in the group of conceptual elements, the unit 32 proceeds to make the interpretion disregarding an incorrect conceptual element, if any, in the group of conceptual elements. With a private information management device, correct contents can be recognized by reproducing the recorded speech, if incorrect recognition has occurred in speech recognition.

At step S64, it is verified whether or not the user's intention interpreted by the intention interpretation unit 32 is the information retrieval. If the user's intension is verified not to be the information retrieval, that is verified to be the memorization of information, the program moves to step S65. If the user's intention is verified at step S64 to be the information retrieval, the program moves to step S66.

At step S65, the information management unit 33 causes the information inputted to the interfacing unit 30 (text data or recorded speech data) to be stored in the private information storage unit 34, in association with the group of conceptual elements extracted by the concept extraction unit 31. The program then moves to step S67. In association with the information, the information formulating time (inputting time), correction time, final reference time or the number of times of reference, is also stored. This pertinent information is optionally presented to the user so that the user is able to grasp the status of the managed information.

At step S66, the information management unit 33 retrieves the information requested by the user, from the information stored in the private information storage unit 34, and outputs the retrieved result to the interfacing unit 30. The information stored in the private information storage unit 34 is stored based on the combination of the conceptual elements. Thus, the information management unit 33 retrieves the information containing the group of conceptual elements contained in the user's input, that is the information requested by the user. However, the information need not necessarily be the information constructed by the group of conceptual elements completely coincident with the group of conceptual elements contained in the input. If there lacks the completely coincident information, retrieval is continued under a relaxed condition to retrieve the information which is as close to the user's intention as possible. An illustrative example of the retrieval processing will be explained subsequently by referring to FIG. 8.

The program moves to step S67 where the interfacing unit 30 sets an output parameter of the information to be presented to the user's input. The output parameter means such parameters as pitch of loudness if the information is outputted as the synthesized speech. If the information is expressed as the text on the display unit 3-1, as shown in FIG. 1, the output parameter means such parameters as the sort, size or decoration of the font used. In the present case, since the speech "conference is held from five today" is inputted at step S61 at a voiced level not lower than a pre-set threshold level, while the conceptual element "modifier: crucial" is extracted at step S62, the interfacing unit 30 sets so that a font larger than the usual size will be used for the displayed letter or the displayed letter will be emphasized by the gothic style. If the input speech is pronounced at a speed faster than the usual pronouncing speed, the interfacing unit 30 sets so that the displayed letter will be in a slanted form.

At step S68, the interfacing unit 30 makes presentation for the user at an output parameter set at step S67. If, for example, the information is stored at step S67, the information stored with the parameter as set is demonstrated on the display unit 3-1, at the same time as the manner in which the recognition and interpretation have been made is displayed.

Also, if the information is retrieved at step S66, the interfacing unit 30 displays the retrieved results in terms of setting parameters. If the information other than text data, such as recorded speech, also is to be presented, it is possible to demonstrate an icon for reproducing the recorded information along with the text data. This icon may eventually be specified by the user to output the speech.

The information management unit 33 calculates evaluation values that can be calculated from the time of formulation (storage) of the pre-set information, time of correction, final reference time and the number of times of reference, taken singly or in combination. The interfacing unit 30 correspondingly arrays the information displayed on the display unit 3-1.

This allows the user to retrieve the information based on the actual memorization such as "this is the information which I saw long before" or "this is the information which I saw only recently". As an example of the evaluation value, the display can be arrayed based on the number of times of reference per unit time based on the formula such as number of times of reference/(final reference time—input time) although several arraying methods may be provided in addition to the above for selection or definition by the user.

Figure 7:
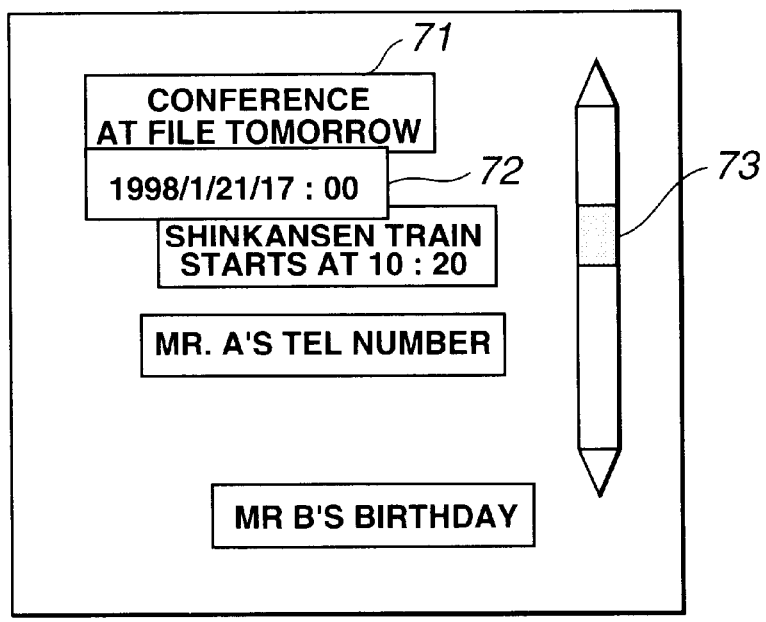
FIG. 7 shows an illustrative display of an application picture frame of the personal information management device shown in FIG. 1.

FIG. 7 shows a display example of an application picture. In this example, the information with high reference frequency and that with low reference frequency are demonstrated on upper and lower sides of the picture, based on the value of evaluation of the reference frequency, as described above. In these display items, output parameters are reflected. For example, the font of the information 71 reading: "conference will be had at five tomorrow" is set so as to be larger than others thus indicating that the information 71 is of crucial nature. The information 72 demonstrated below the information 70 indicates the time, namely "five tomorrow". The screen displayed on the display unit 3-1 can be scrolled up-and-down on actuating a scroll bar 73 with finger or a touch-pen 8. The information can be freely re-arrayed by the user. If the information is re-arrayed, the evaluation value can be modified correspondingly. If the user has acted on the information displayed on the display unit 3-1, such as to change the font size, the conceptual element derived from such actuation, in this case the accentuation of the information, is added or modified newly.

Figure 8:
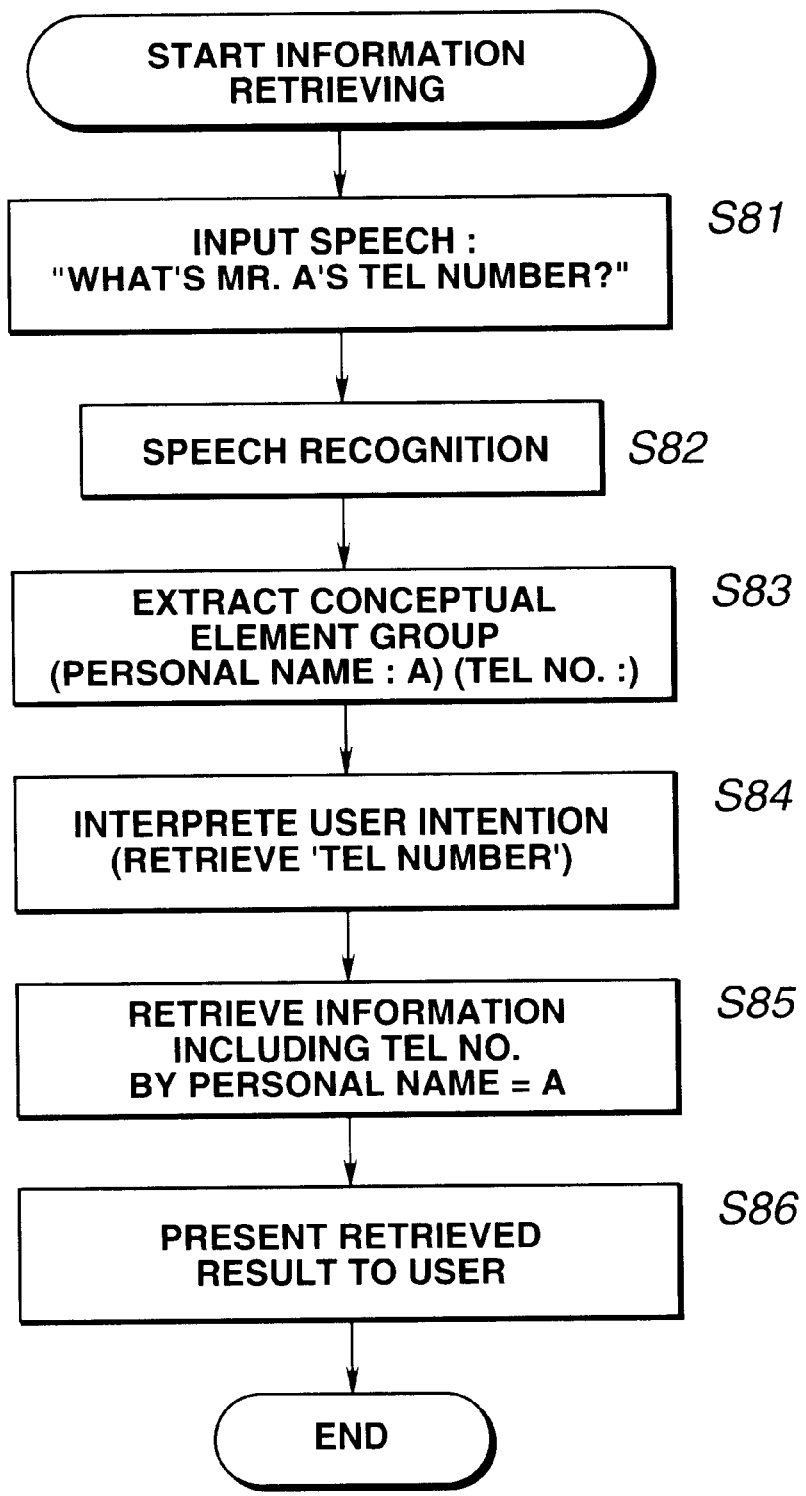
FIG. 8 is a flowchart showing a specified example of information retrieving processing in the personal information management device shown in FIG. 1.

Reference is made to the flowchart of FIG. 8 for illustrating a specified example of the information retrieving processing. It is assumed in the present example that the user inputted the telephone number for "Mr. A" in the past and the telephone number is now to be retrieved. First, at step S81, the user inputs the speech at the interfacing unit 30. For example, the user inputs the speech in the interfacing unit 30, such as the speech reading: "What's the telephone number of Mr. A?". The input speech need not be a sentence but may be a sequence of key words, such as "Mr. A", "telephone number" and "certain and certain number". The program moves to step S82 where the interfacing unit 30 recognizes the input speech to output the recognized result to the concept extraction unit 31. At step S83, the concept extraction unit 31 extracts the group of conceptual elements from the results of recognition supplied from the interfacing unit 30 to output the extracted group of the conceptual elements to the intention interpretation unit 32. In the present case, the conceptual elements "name: A" and "telephone number: a certain and certain number" are extracted.

The program then moves to step S84 where the intention interpretation unit 32 interprets the user's intention in association with the group of conceptual elements extracted by the concept extraction unit 31. Since the definite intention for retrieval "a certain and certain number" is included in the group of conceptual elements, it may be concluded that the user's intention is the "information retrieval" and the object of retrieval is the "telephone number". At step S85, the user's intention, interpreted by the intention interpretation unit 32, is sent to the information management unit 33, which then retrieves the pertinent information from the information stored in the private information storage unit 34 to output the retrieved result to the interfacing unit 30.

Figure 9:
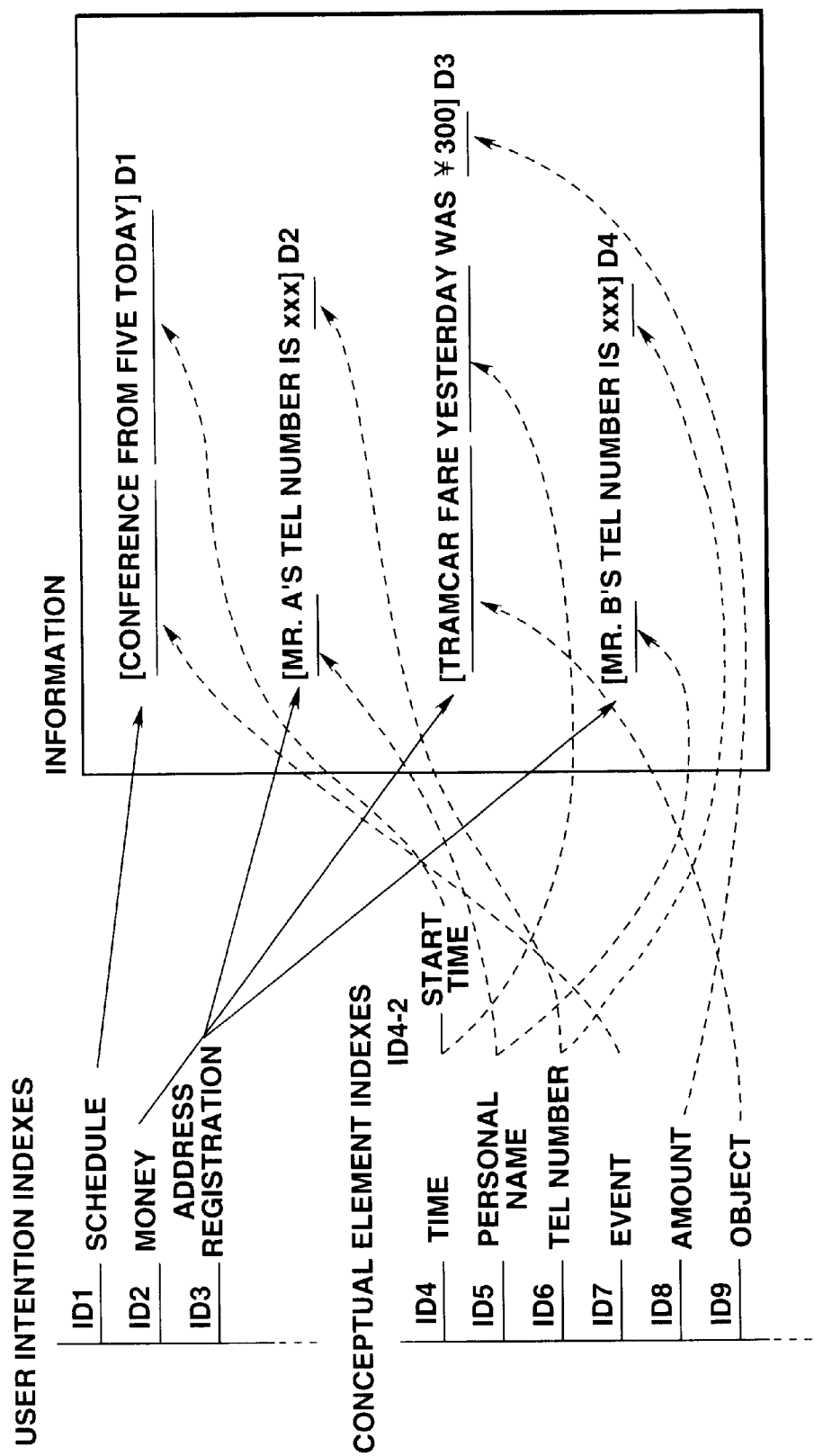
FIG. 9 illustrates information retrieving processing.

Assume that the contents stored in the private information storage unit 34 are as shown in FIG. 5. FIG. 9 illustrates the retrieval processing performed at step S85. Since the "personal name" and "telephone number" have been obtained as the conceptual elements acting as a key for retrieval, the information management unit 33 retrieves the information corresponding to the conceptual element indices ID5 and ID6 having the conceptual elements as keys. In the present case, the conceptual element index ID5 can be linked to "Mr. A" of the information D2 and to "Mr. B" of the information D4, the information D2 is selected as the information conforming to the retrieval item, because "A" is contained as a value of the conceptual element in the link information. In this manner, the most suited information is ultimately selected by taking together the results of retrieval by the respective conceptual elements. In the present case, there are two conceptual elements (personal name: A) and (telephone number: a certain and certain number) and the information that meets these two conditions is the information D2. Thus, the information management unit 33 verifies that this information D2 is the information that satisfies the user's intention for retrieval.

At step S86, the user interfacing unit 30 demonstrates the retrieved result, supplied from the information management unit 33, on the display unit 3-1.

There are two methods of presenting the retrieved information to the user, that is a method of presenting the retrieved information unchanged and a method of presenting only the phrases requested by the user. If the latter method is used, since the user's intention in the present case is the retrieval of the telephone number, the user interfacing unit 30 presents the value of the conceptual element of the telephone number of the information D2 of the retrieved result. If there lacks the information that completely satisfies the conditions, it is possible to present plural information that satisfies at least one condition. It is also possible to add scores to the results of consistence of the respective conceptual elements and to present the conceptual elements in the order of the decreasing scores. If the information is consistent completely up to the value of the conceptual element, such as the information D4 in FIG. 9, or if the value of the conceptual element in inconsistent, a score 2 or a score 1 is added, respectively. This allows for an input error or mistaken letter recognition by the user.

As furnishing mediums for supplying to the user the computer program executing the above respective processing operations, communication mediums, such as networks or satellites, may be used in addition to the magnetic discs, CD-ROMs or solid memories.

Meanwhile, in the speech recognition processing executed by the interfacing unit 30, conceptual element extraction processing by the concept extraction unit 31 or in the input intention interpreting processing, performed by the intention interpretation unit 32, the processing is executed in association with the dictionaries or processing rules provided in the respective units. Thus, if the user has made an input not presupposed to be handled as an input by a user, the result is likely to be inconsistent with the processing inherently requested by the user. If processing is adapted to be made at an outset, there is the probability that sentences or phrases be recognized in a mistaken manner in the speech recognition processing in the interfacing unit 30. The above processing is executed sequentially, that is in the sequence of S61, S62, S63, . . . , as shown in the processing sequence of FIG. 6, so that, if, in the speech recognition processing, the user input is recognized incorrectly, there is a possibility that, in the subsequent processing for extracting the conceptual elements, processing is carried out based on the incorrect inputs, thus giving rise to a result of operation not intended by the user.

This can be evaded by providing means in the interfacing unit 30 for presenting results of speech recognition processing and the processing results of the concept extraction unit 31 and the intention interpretation unit 32 and for correcting or controlling these processing results. It is possible for the user to confirm the processing process from the presented results and to correct errors, if any, or to halt the processing. In correcting the errors, dictionary elements or rule elements proper to the user should be able to be added, in which case, if an input has once been processed incorrectly, the dictionaries or rules, added for guiding the user to correct processing, the subsequent operation can be performed as expected by the user.

As information inputting means in the interfacing unit 30, selection means are provided, whereby the user can select and input the usable conceptual elements or input intention, as information inputting means. By so doing, if the user intends to input the information reliably or to input the information analogous with the information, inputted previously, such information can be inputted to the system easily. Also, if the conceptual elements or the input intention are selectively added to the user input, it is possible to input the information which reflects the modified information more acutely or the information reflecting the user's intention more faithfully.

Figure 10:
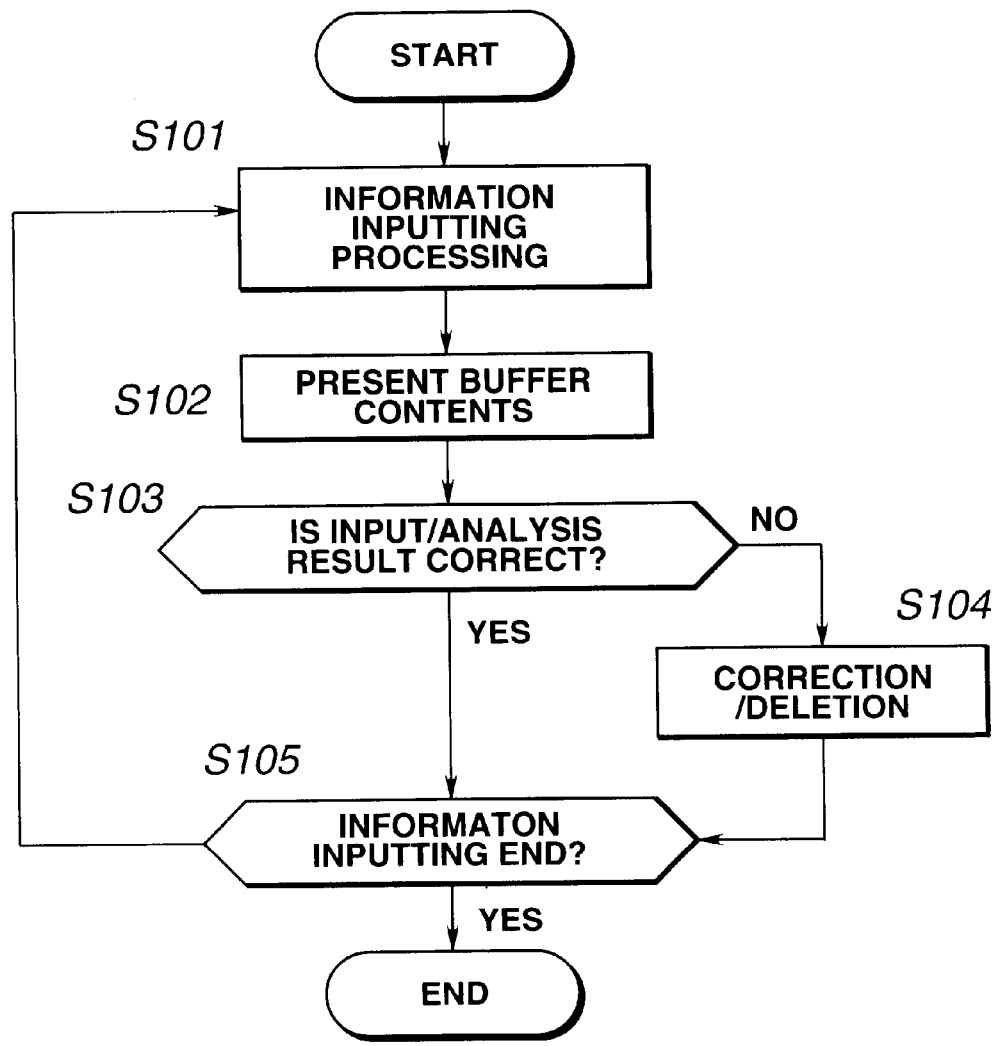
FIG. 10 is a flowchart showing the information inputting procedure by a user.
Figure 11:
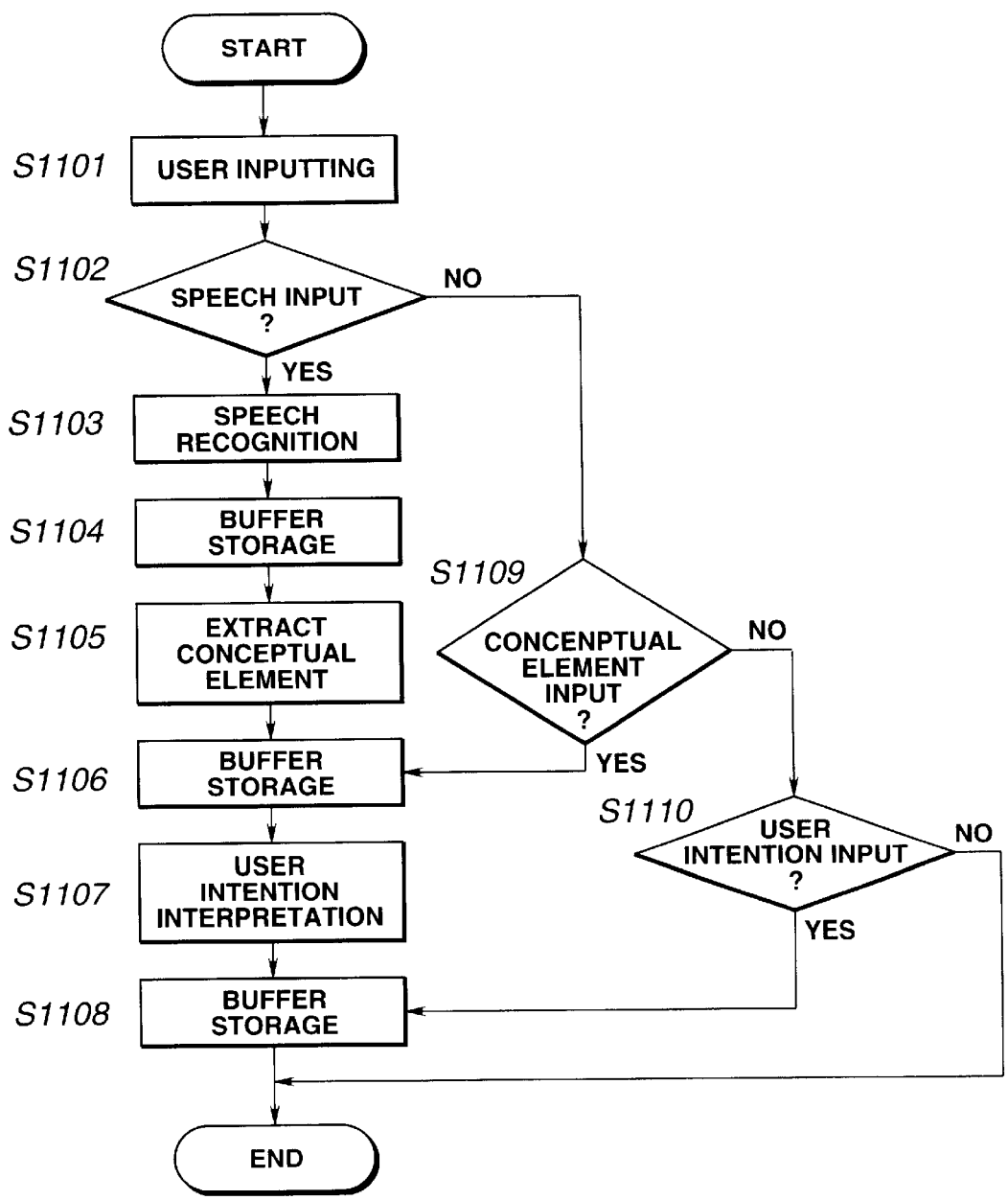
FIG. 11 is a flowchart showing details of the information inputting by the user.

FIG. 10 shows the information inputting sequence. FIG. 11 shows the processing flow at step S101 in FIG. 10 in more detail. Taking an example in which the user desires to store in the personal information management device 100 "I must phone to Mr. C tomorrow", the operation on error occurrence in the processing process is explained with reference to FIGS. 10, 11 and 12.

First, at step S101 of FIG. 10, the user inputs the information. The information inputting operation is performed at a step S1101 by the user acting on the personal information management device 100 of FIG. 1, such as by the user selecting an object demonstrated on the display unit 3-1 by the touch-pen 8 or acting on the scroll key 5 or the decision key 6.

If the sequence of operations by the user is done at step S1101, the user verifies at step S1102 whether the input is the speech input, depending on whether the talk switch 4 of the personal information management device 100 has been thrust. If the input is the speech input, the speech recognition processing is executed at step S1103. The text information of the results of recognition is stored at step S110 in a buffer provided in the RAM 13. Then, at step S1105, concept extraction processing is carried out and, at step S1106, the conceptual elements as the result of extraction are stored in the buffer provided in the RAM 13. At step S1107, the intention interpreting processing is carried out and at step S1108 and the input intention as the interpreted result is stored in the buffer provided in the RAM 13.

If, at step S1102, the input is not the speech input, it is verified whether or not the input is that of the conceptual elements. This can be done based on definite selection by the user, such as selection by the touch-pen 8 of the object specifying an optional conceptual element demonstrated on the display unit 3-1 of the personal information management device 100. If the conceptual elements are selected, the program moves to the next step S1106 to store the selected conceptual elements in a buffer provided in the RAM 13. The program then moves to step S1107 and the following steps.

If, at step S1109, the input is not that of the conceptual elements, it is verified at step S1110 whether the input is that of the user's intention. This can be done by an input by definite selection by the user, such as by selection with the touch-pen 8 of an object indicating an optional input intention demonstrated on the display unit 3-1. If, at step S1110, the input is not that of the user's intention, a decision is given to the effect that the input is not that by the user, and accordingly the processing is terminated.

Here, an object meaning (modifier: indispensable) as demonstrated on the display unit 3-1 is selected as the conceptual element, in order to demonstrate the crucialness definitely. At step S1109 of FIG. 11, the decision is given that the input is that of the conceptual element and the contents thereof are stored in a buffer. At the next step S102 of FIG. 10, the buffer contents are presented to the user, using the display unit 3-1. At the next step S103, the user verifies whether or not the input result is correct. If the input result is in error, it is corrected or deleted at step S104. If the input is correct, it is verified whether or not there is any new information input at step S105. This decision is definitely given by the user by the touch-pen 8 or by the key input.

If then the user inputs to the present device "I must phone to Mr. C tomorrow" by speech input, it is recorded, at the same time as it is converted into text by recognition processing at step S1003 in FIG. 11. The result is stored at step S1004 in a buffer. Here, the mistaken recognition: "I shall not phone to Mr. B tomorrow" has occurred, and the conceptual elements: (modifier: indispensable), (date and time: tomorrow), (name: B), (event: telephone) and (behavior: cancel) are extracted at step S1005. At step S1007, interpretation is made: "the schedule is deleted".

Figure 12:
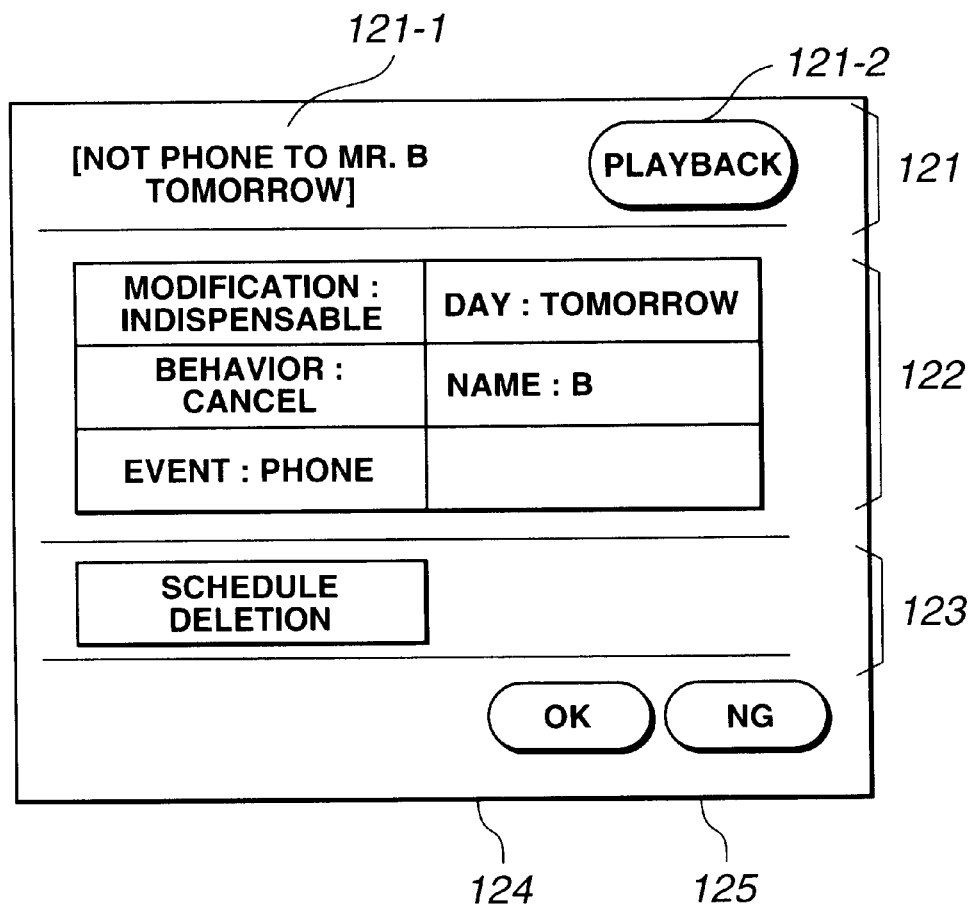
FIG. 12 shows an illustrative picture presenting the results of information inputting processing.

At step S102 of FIG. 10, the information shown in FIG. 12 is presented as the contents of the buffer stored in the RAM 13. In FIG. 12, the results of each processing process are sequentially presented from the top of the picture. Specifically, the processing results are indicated by a speech input result display unit 121, a conceptual element display unit 122 and a user's intention displaying unit 123, looking from the top of the picture. The speech input result display unit 121 is made up of a text portion 121-1, representing the results of speech recognition, and a sound recording data reproducing command portion 121-2. The conceptual element display unit 122 presents the group of conceptual elements extracted from the user input or selectively inputted by the user and stored in the buffer. Moreover, the user's intention displaying unit 123 presents the user's intention interpreted from the group of the conceptual elements, selectively inputted by the user and stored in the buffer. An OK key 124 and a NG key 125 permit the decision by the user to these results. Specifically, if the contents shown by the speech input result display unit 121, conceptual element display unit 122 and by the user's intention displaying unit 123 are valid, the OK key 124 is thrust, whereas, if the contents are in error and re-trial is desirable, the NG key 125 is thrust.

The user is able to check the processing process presented in FIG. 12 to confirm that the processing has been made in a manner different from the user's intention. If the user finds at step S103 that correction or deletion is necessary, correction or deletion becomes possible at step S104. For performing the correction or deletion, the user points by pen operation to the speech input result display unit 121, conceptual element display unit 122 and to the user's intention displaying unit 123 to command the results of processing for correction to permit the selection or re-entry of the correct processing results. Here, the user is able to correct the processing results to those conforming to the inherent input intention of the user by correcting to C the value of the conceptual element having the name attribute in the processing for extracting the conceptual element, and by deleting the conceptual element (behavior: cancel). As these corrections are made, the corrections are reflected in the text of the original results of recognition from which the meaning has been extracted so that the information is held as the text "I must phone to C tomorrow".

When the user completes the correction operation, it is checked whether or not the input is to be made in succession at step S105. Here, if the desired processing of the user is done by the above processing, the user discontinues the input processing to proceed to execution processing.

In this manner, errors produced in the information inputting process can be corrected, while the additional information that cannot be expressed by a sole inputting operation can be sequentially added to enable the inputting of more expressive information.

Table 1 shows an illustrative table of the user intention rule defining the user's intention corresponding to the combination of optional conceptual elements. In this Table, a string of an optional number of conceptual elements is shown on the left side of arrows, whilst the user's intention as the interpretation for the group of conceptual elements matched to the left side is stated on the right side of the arrows. Here, pre-defined specified symbols can be used as values of the conceptual elements. For example, "*" denotes any arbitrary value provided that the attribute of the conceptual elements is coincident. On the other hand, "past" means any time values older than the current time in their entirety.

TABLE 1

| User Intention Rules | |
| --- | --- |
| Conceptual elements | User's intention |
| (name: *), (telephone: *), (string of numerals: *) | → address registration |
| (time: *), (event: *) | → schedule |
| (time: *), (place: *) | → schedule |
| (time: past), (amount: *) | → amount |

Figures 13, 14:
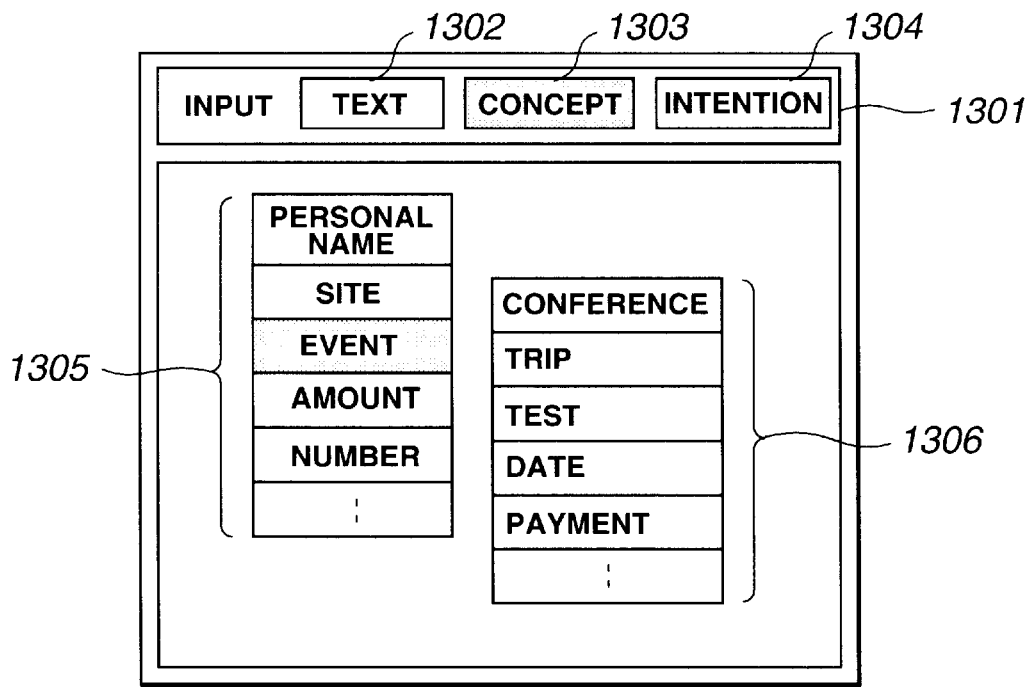
FIG. 13 shows an illustrative picture executing the inputting of conceptual elements.
FIG. 14 shows an illustrative picture presenting a list of the information corresponding to the user's intention.

FIG. 13 shows an exemplary table showing the process of inputting the information by the user with the aid of the personal information management device 100. In FIG. 13, items showing three input types are presented in an input item selection unit 1301. The user is able to input specified forms by acting on one of a text input button 1302, a conceptual element input button 1303 and a user intention input button 1304, using the touch-pen,8. The text input button 1302 is used for inputting the information by text input, while the conceptual element input button 1303 is used for inputting the conceptual elements and the user intention input button 1304 is used for inputting the user intention. FIG. 13 shows an exemplary display of the process of inputting the conceptual elements. Specifically, the conceptual element input button is thrust by the touch-pen 8 to display a list list 1305 representing the attributes of the conceptual elements. The item "event" in the list 1305 is selected to display a list 1306 showing the value of the conceptual elements corresponding to the event. By selecting the arbitrary value in the list, the user is able to enter a conceptual element desired to be inputted.

FIG. 14 shows an exemplary form of presenting the information in association with the user's intention. In a user intention selection unit 1401A of FIG. 14, a plurality of buttons demonstrating the user's intention in a list are displayed. The user is able to thrust an optional button in the user intention selection unit 1401 by the touch-pen 8 to display only the information relevant to the user's intention. Here, the user has commanded to present only the information in connection with the "amount" so that the information concerning the "amount", such as the "date", "item" or the "amount" will be presented in an appropriate display form.

Figure 15:
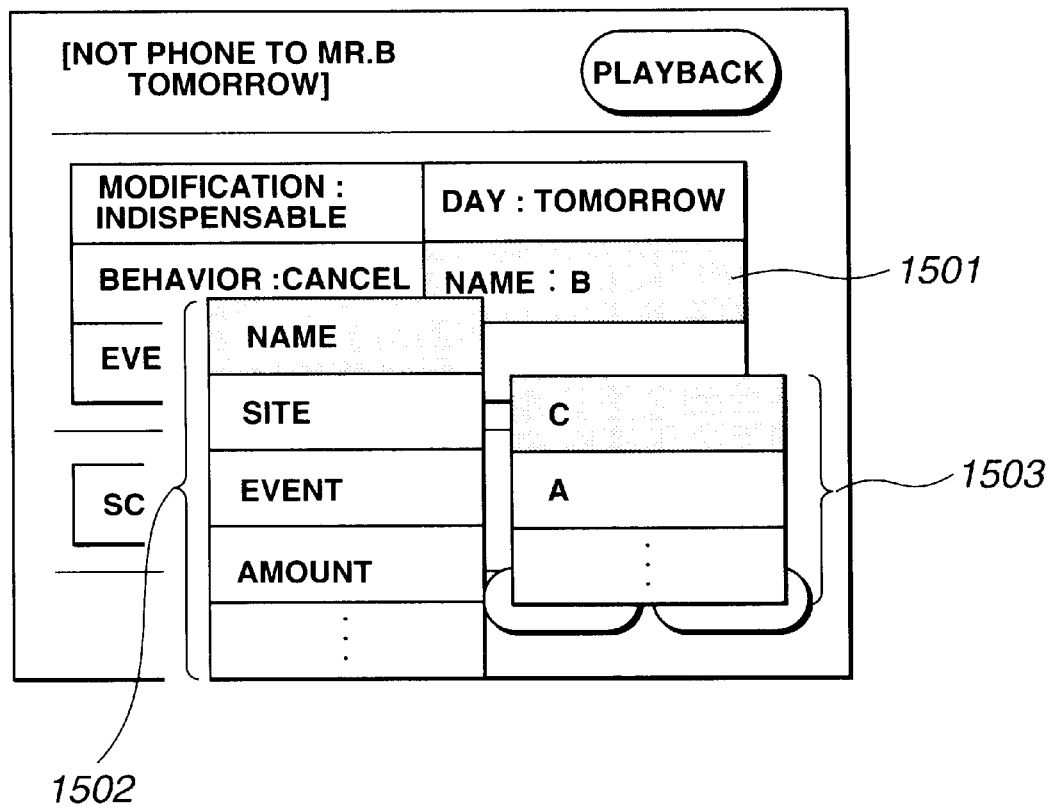
FIG. 15 shows an illustrative picture executing the correction of user inputting items.

FIG. 15 shows an example of the display unit showing the information correction process. This shows the process in which the (name: B) extracted as the conceptual element is to be corrected to (name: C). If the user selects the item desired to be corrected, which, in the case of FIG. 15, is a conceptual element 1501 of (name: B), using the touch-pen 8, a list 1502, showing attributes of the conceptual elements, is displayed. In the list 1502, the attribute "name" of the selected conceptual element (name: B) is displayed in an upper end of the list 1502. If the user selects the attribute of the conceptual element displayed on the list 1502, the list 1503 showing the values of the conceptual element is displayed. Since the present actuation is concerned with correction, the value "B" coincident with the selected conceptual element is excluded on the list 1503. If the user then selects the value "C" of the conceptual element displayed on the list 1503, the conceptual element (name: B) 1501 desired to be corrected can be changed to (name C).

In the preferred embodiment, the present invention is applied to the portable personal information management device 100 shown in FIG. 1. However, the present invention can, of course, be applied to other devices. Although the conceptual elements are extracted from both the language information and the non-language information in order to reflect the management of the information in more detail, it is possible to extract the conceptual element from either one of the information.

The furnishing medium for furnishing the computer program for executing the processing may utilize the communication mediums, such as network or satellite in addition to the recording mediums, such as magnetic disc, CD-ROM or solid memory.

What is claimed is:

1. An information processing device comprising:
   input means for inputting information;
   extraction means for extracting conceptual elements from the information input by said input means;
   interpreting means for interpreting a user's input intention for said information in association with the conceptual elements extracted by said extracting means; and
   executing means for executing pre-set processing on said information in association with said input intention as interpreted by said interpreting means.

2. The information processing device according to claim 1 wherein
   said executing means performs one of storing said information, retrieving other information relevant to said information, and deleting the information in association with said input intention.

3. The information processing device according to claim 2 wherein said execution means sets a compression ratio for compressing said information in association with a frequency with which the information is referred to.

4. The information processing device according to claim 1 further comprising:

presenting means for presenting results of execution by said execution means wherein said presenting means sets output parameters of the presented results of execution in association with said conceptual elements.

5. The information processing device according to claim 4 wherein, when presenting plural information as a result of said results of execution, said presenting means sets an order of presentation in association with a frequency with which the information is referred to.

6. The information processing device according to claim 4 wherein said output parameter is one of a shape and a size of a display font corresponding to the results of execution.

7. The information processing device according to claim 4 wherein said output parameter is one of a pitch frequency and a pronouncing speed of speech corresponding to the results of execution.

8. The information processing device according to claim 1 wherein said information is speech and said information processing device further comprises recognition means for recognizing speech input by said input means.

9. The information processing device according claim 8 further comprising:

recording means for recording sound when said speech is being recognized by said recognition means, wherein said recognition means associates the conceptual elements extracted by said extraction means with said speech recorded by said recording means.

10. The information processing device according to claim 1 wherein said input means includes selection means for the user to select and input the conceptual elements extracted by said extraction means.

11. The information processing device according to claim 1 wherein said input means includes selection means for selecting and inputting the input intention interpreted by said interpreting means.

12. The information processing device according to claim 1 further comprising:

buffer means for storing respective processing results in said input means, extraction means and the interpreting means; and presenting means for presenting the respective processing results stored in said buffer means to the user.

13. An information processing method comprising the steps of:

inputting information;

extracting conceptual elements from the information input in said inputting step;

interpreting a user's input intention in association with the conceptual elements extracted in said extracting step; and executing pre-set processing on said information in association with the input intention construed in said interpreting step.

14. An information furnishing medium for furnishing a computer-readable program adapted for causing an information processing device to execute processing which comprises:

an input step for inputting information;

an extracting step for extracting conceptual elements from the information input in said input step;

an interpreting step for interpreting a user's input intention in association with the conceptual elements extracted in said extracting step; and an executing step for executing pre-set processing on said information in association with the input intention construed in said interpreting step.

* * * * *